US012567283B2

(12) United States Patent
Wu et al.

(10) Patent No.: US 12,567,283 B2
(45) Date of Patent: Mar. 3, 2026

(54) FACIAL RECOGNITION DATABASE USING FACE CLUSTERING

(71) Applicant: ObjectVideo Labs, LLC, Tysons, VA (US)

(72) Inventors: Yuanwei Wu, McLean, VA (US); Gang Qian, McLean, VA (US); Sung Chun Lee, Tysons, VA (US); Allison Beach, Leesburg, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 420 days.

(21) Appl. No.: 17/879,219

(22) Filed: Aug. 2, 2022

(65) Prior Publication Data

US 2023/0044233 A1    Feb. 9, 2023

Related U.S. Application Data

(60) Provisional application No. 63/228,682, filed on Aug. 3, 2021.

(51) Int. Cl.
*G06V 40/50* (2022.01)
*G06V 10/762* (2022.01)
(Continued)

(52) U.S. Cl.
CPC ............ *G06V 40/50* (2022.01); *G06V 10/762* (2022.01); *G06V 40/172* (2022.01); *G07C 9/00563* (2013.01)

(58) Field of Classification Search
CPC ... G06V 40/50; G06V 10/762; G07C 2209/02
See application file for complete search history.

(56) References Cited

U.S. PATENT DOCUMENTS 8,208,695 B2 * 6/2012 Tang ..................... G06V 40/16
                                                        382/118
11,610,413 B1 * 3/2023 Nguyen ................. G06V 20/44
                        (Continued)

FOREIGN PATENT DOCUMENTS

CN        102065218 A  *  5/2011  ......... G06K 9/00221
CN        102622589 A  *  8/2012
                        (Continued)

OTHER PUBLICATIONS

C. Otto, B. Klare and A. K. Jain, "An efficient approach for clustering face images," 2015 International Conference on Biometrics (ICB), Phuket, Thailand, 2015, pp. 243-250, doi: 10.1109/ICB.2015.7139091. (Year: 2015).*

*Primary Examiner* — Michael Robert Cammarata
(74) *Attorney, Agent, or Firm* — Fish & Richardson P.C.

(57) ABSTRACT

Methods, systems, and apparatus, including computer programs encoded on computer storage media, for fast user enrollment for facial recognition using face clustering. A property monitoring system may reduce user input requirements by automatically performing face clustering, and requesting a user identify face images by cluster. Presenting clusters of faces to a user may allow the user to more quickly indicate multiple face images are of a user, and allow the property monitoring system to prioritize which clusters of faces are to be reviewed by the user. Accordingly, the property monitoring system may reduce processing and requests for user input by clustering faces.

20 Claims, 6 Drawing Sheets

(51) Int. Cl.
 *G06V 40/16* (2022.01)
 *G07C 9/00* (2020.01)

(56) References Cited

U.S. PATENT DOCUMENTS

| | | | | |
|---|---|---|---|---|
| 2003/0210808 A1* | 11/2003 | Chen | ................. | G06V 40/16 |
| | | | | 382/118 |
| 2004/0151384 A1* | 8/2004 | Yang | ................. | G06V 10/60 |
| | | | | 382/225 |
| 2006/0251338 A1* | 11/2006 | Gokturk | ............ | G06F 16/5854 |
| | | | | 707/E17.022 |
| 2012/0294535 A1* | 11/2012 | Irmatov | ............... | G06F 18/214 |
| | | | | 382/195 |
| 2012/0314915 A1* | 12/2012 | Ochi | ................. | G06V 20/30 |
| | | | | 382/118 |
| 2014/0056541 A1* | 2/2014 | Inoue | ............... | H04N 21/8153 |
| | | | | 382/306 |
| 2015/0379331 A1* | 12/2015 | Nemat-Nasser | ........ | G07C 5/02 |
| | | | | 382/118 |
| 2016/0012280 A1* | 1/2016 | Ito | ................. | G06V 40/173 |
| | | | | 382/305 |
| 2017/0124385 A1* | 5/2017 | Ganong | ................. | G06F 16/50 |
| 2020/0279279 A1* | 9/2020 | Chaudhuri | ............. | G06N 5/04 |
| 2020/0293759 A1* | 9/2020 | Debnath | ............. | G06V 10/763 |
| 2021/0287469 A1* | 9/2021 | Ryhorchuk | ......... | G06V 40/172 |
| 2021/0312734 A1* | 10/2021 | Bajaj | ........................ | H04L 9/14 |
| 2022/0207972 A1* | 6/2022 | Madden | ........... | G08B 13/19645 |
| 2023/0013117 A1* | 1/2023 | Gupta | ................. | G06V 40/172 |
| 2024/0265731 A1* | 8/2024 | Afshar | ................. | G06V 10/95 |
| 2024/0320945 A1* | 9/2024 | Yamamoto | ............... | G06T 7/00 |

FOREIGN PATENT DOCUMENTS

| | | | | | | |
|---|---|---|---|---|---|---|
| CN | 106778501 A | * | 5/2017 | ....... | G06F 18/24155 |
| CN | 110458078 A | * | 11/2019 | .......... | G06F 18/214 |
| CN | 111553288 A | * | 8/2020 | ............ | G06F 18/22 |
| CN | 111652260 A | * | 9/2020 | .......... | G06F 18/214 |
| EP | 3502924 A1 | * | 6/2019 | .......... | G06F 16/784 |
| EP | 3905120 A1 | * | 11/2021 | ........ | G06K 9/00228 |
| JP | 2016200969 A | * | 12/2016 | | |
| JP | 6529314 B2 | * | 6/2019 | | |
| WO | WO-2010041377 A1 | * | 4/2010 | ....... | G06F 17/30247 |
| WO | WO-2023007859 A1 | * | 2/2023 | .......... | G06V 10/762 |

* cited by examiner

100

105

115

106

A) ONE HUNDRED IMAGES OF FACES

120

B) GENERATE MULTIPLE CLUSTERS OF SIMILAR FACES

F) ENROLL USER X & GENERATE NEW CLUSTER BASED ON FACES 11-15

J) ENROLL USER Y

G) NEW CLUSTER OF TEN SIMILAR FACES

I) FACES ALL BELONG TO USER Y

C) CLUSTER OF FIFTEEN SIMILAR FACES

E) FACES 1-10 BELONG TO USER X AND FACES 11-15 BELONG TO USER Y

130

H) RECEIVE SECOND USER INPUT

D) RECEIVE USER INPUT

FACE VERIFICATION USER INTERFACE

PLEASE INDICATE TO WHOM EACH FACE BELONGS

USER X

USER Y

132

FIG. 1

FACIAL RECOGNITION DATABASE USING FACE CLUSTERING

CROSS-REFERENCE TO RELATED APPLICATION

This application claims the benefit of U.S. Provisional Application No. 63/228,682, filed Aug. 3, 2021, the contents of which are incorporated by reference herein.

TECHNICAL FIELD

This disclosure application relates generally to monitoring systems, and more particularly, to facial recognition.

SUMMARY

Techniques are described for user enrollment for facial recognition using face clustering. A property monitoring system may perform facial recognition and automatically perform various actions based on whether a face is recognized. For example, the property monitoring system may determine that a person at the door step is an enrolled user that lives at the property and, in response, automatically unlock a front door. In another example, the property monitoring system may determine that a person at the door step is not an enrolled user and, in response, automatically alert a resident that a visitor is at the doorstep.

The property monitoring system may recognize faces by enrolling users for facial recognition. Initially, before any users are enrolled for facial recognition, the property monitoring system may detect and store images of faces, also referred to as face images, seen by cameras at the property for a first week. For example, the property monitoring system may store a hundred face images, where the face images include forty face images of a first resident, fifty face images of second resident, five face images of a neighbor, and five face images of a newspaper deliveryman. The property monitoring system may then present each face image to a user, and a user may indicate which users they want to enroll for facial recognition. For each of the users to be enrolled for facial recognition, the user may indicate which face images are of that user. For example, the user may indicate they want to register a first resident for facial recognition and that forty face images are of the first resident, and not indicate that they want to enroll a neighbor for facial recognition. The property monitoring system may then train a classifier to recognize the enrolled users based on the face images indicated as belonging to those enrolled users.

Training the property monitoring system to recognize an enrolled user may require multiple face images of the enrolled user. However, having a user evaluate many face images and indicate who each face belongs to can be a time-consuming task. Unfortunately, it may also be difficult for the property monitoring system to enroll users without user input as the property monitoring system may not know in advance how many people are to be enrolled, which faces belong to people that should be enrolled, and which faces belong to people that should not be enrolled.

The property monitoring system may reduce user input requirements by automatically performing face clustering, and requesting a user identify face images by cluster. Presenting clusters of faces to a user may allow the user to more quickly indicate multiple face images are of a user, and allow the property monitoring system to prioritize which clusters of faces are to be reviewed by the user. Accordingly, the property monitoring system may reduce processing and requests for user input by clustering faces.

Implementations of the described techniques may include hardware, a method or process implemented at least partially in hardware, or a computer-readable storage medium encoded with executable instructions that, when executed by a processor, perform operations.

In some implementations, the method includes: identifying, from a set of face images of faces, clusters of face images, where the clusters of face images include a particular cluster; receiving, from a device, an indication that the particular cluster includes a first subcluster of face images that depict a first person and a second subcluster of face images that depict a second person; in response to receiving the indication, determining that a number of face images in the first subcluster of face images that depict the first person does not satisfy an enrollment criteria; identifying, using the face images that were indicated as showing the first person and from the set of face images of faces, another cluster of face images that depict the first person; and enrolling, in a facial recognition database, the first person using the other cluster of face images.

In some implementations, the method includes: in response to receiving the indication, determining that a second number of face images in the second subcluster of face images that depict the second person satisfies the enrollment criteria; and in response to determining that the second number satisfies the enrollment criteria, enrolling, in the facial recognition database, the second person using the second subcluster of face images that depict the second person.

In some implementations, the method includes enrolling the first person using the other cluster of face images and the first subcluster of face images.

In some implementations, the method includes providing the cluster of face images to the device, wherein receiving the indication is responsive to providing the cluster of face images.

In some implementations, the method includes: providing the cluster of face images includes providing the cluster of unknown face images to the device, the method including: detecting, using clustering with the first subcluster of face images and in a plurality of images, the other cluster of face images that depict the first person.

In some implementations, the method includes detecting the other cluster of face images using spectral clustering.

In some implementations, the method includes providing data for the facial recognition database to a facial recognition system to cause the facial recognition system to recognize one or more people including the first person using the facial recognition database.

In some implementations, the method includes: recognizing, using data for the other cluster of face images in the facial recognition database, the first person; and in response to recognizing the first person, determining whether to perform an action or to skip performing an action.

In some implementations, the method includes in response to recognizing the first person, sending an instruction to a door to cause the door to unlock.

In some implementations, the method includes, in response to recognizing the first person, determining to skip sending, to a second device, an alert about the first person.

In some implementations, the method includes identifying the other cluster includes identifying the other cluster using at least one of an affinity matrix or a binary support vector machine.

The details of one or more implementations are set forth in the accompanying drawings and the description below. Other features will be apparent from the description and drawings, and from the claims.

DESCRIPTION OF DRAWINGS

FIG. 1 illustrates an example block diagram of a system for user enrollment for facial recognition using face clustering.

Like reference numbers and designations in the various drawings indicate like elements

DETAILED DESCRIPTION

Figure 2:
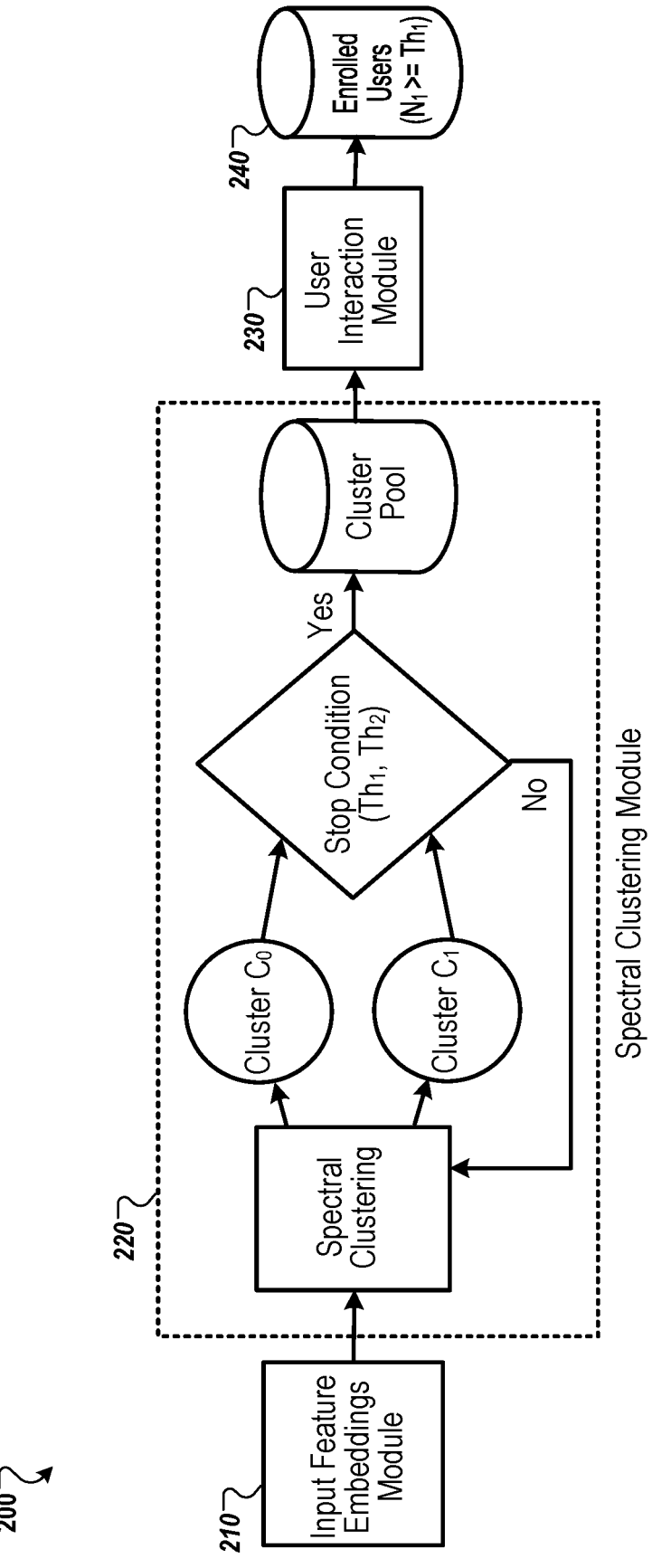
FIG. 2 illustrates an example block diagram of a server that enrolls users based on clusters of faces.

FIG. 1 illustrates an example block diagram of a system 100 for user enrollment for facial recognition using face clustering. The system 100 includes a camera 106 at a property 105 that captures face images of people at the property 105, a server 120 that generates clusters of faces from the face images and enrolls users for facial recognition based on user input, and a user device 130 that provides a user interface to receive the user input on the clusters of faces.

The camera 106 may be a video/photographic camera or other type of optical sensing device configured to capture face images of people at the property 105. For example, the camera 106 may be a doorbell camera located next to a front door 115 of the property 105. In another example, the camera 106 may be a camera that is separate from the doorbell that is located above the front door 115 and has a view of humans approaching the front door 115.

The camera 106 may capture face images of people at the property 105 and provide the face images to the server 120. For example, the camera 106 may capture twenty face images of user X, thirty face images of user Y, and fifty face images of user Z and provide the one hundred face images to the server 120. In some implementations, the camera 106 may include a human detector on the camera 106 that detects faces in images, and the camera 106 may provide the server 120 a face image for every face that wasn't detected in an image that was captured right before or if a face hasn't been provided within the last minute, five minutes, or some other length of time.

The server 120 may be one or more computing devices that receive the face images of faces of people at the property 105 and generates clusters of faces from the face images. For example, the server 120 may receive one hundred face images of three users and generate nine clusters of similar looking faces, where each cluster includes five to fifteen face images and each face image only appears in a single cluster. While the server 120 is shown remotely from the property 105 in FIG. 1, the server 120 may instead be part of a monitor control unit that controls sensors, e.g., door sensors, windows sensor, etc., and devices, e.g., locks, within the property 105. Clustering performed by the server 120 is described below in more detail in association with the other figures.

The server 120 provides the clusters of faces to the user device 130 and receives indications from the user device 130, where the indications indicate who is shown in the faces image. For example, the server 120 may receive an indication that a cluster of fifteen faces includes some faces of a first user and some faces of a second user. In another example, the server 120 may receive an indication that a cluster of fifteen faces includes only faces of a first user.

The server 120 enrolls users and generates new clusters of faces based on the indications received from the user device 130. For example, the server 120 may enroll the first user and generate a new cluster of faces for the second user. The server 120 may then provide the new clusters to the user device 130 and receive additional indications from the user device 130. For example, the server 120 may provide the new cluster for the second user to the user device 130, receive an indication from the user device 130 that all faces in the new cluster belong to the second user, and, in response, enroll the second user using the new cluster.

The user device 130 may be a computing device that is used by a user to view clusters of faces and provide input that indicates to whom faces belong. For example, the user device 130 may be a smartphone that includes an installed dedicated security application for monitoring the property, and a face verification user interface may be accessed through the application. In another example, the user device 130 may be a laptop through which a user may access a website in which the user may interact with a face verification user interface provided by the server 120.

In the example shown in FIG. 1, the camera 106 may provide to the server 120 one hundred face images captured during a first week before any users are enrolled for facial recognition (Stage A). The server 120 may generate seven clusters of similar faces (Stage B). The server 120 may send a first cluster of fifteen of the most similar faces to the user device 130 (Stage C). The user device 130 displays the first cluster in a face verification user interface and receives user input that indicates that the first ten face images shown in the interface are user X and the last five face images shown in the interface are user Y (Stage D). The user device 130 provides an indication of the user input to the server 120 (Stage E). The server 120 enrolls user X based on the indication of the user input and generates a new cluster of ten faces based on the last five face images (Stage F). The server 120 provides the new cluster to the user device 130 (Stage G). The user device 130 displays the new cluster in the face verification user interface and receives second user input that indicates all ten of the faces in the new cluster are user Y (Stage H). The user device 130 provides a second indication of the second user input to the server 120 (Stage I). The server 120 enrolls user Y based on the second indication (Stage J).

FIG. 2 illustrates an example block diagram of a server 200 that enrolls users based on clusters of faces. In some implementations, the server 200 may be the server 120. The server 200 includes an input feature embedding module 210, a spectral clustering module 220, a user interaction module 230, and an enroll user data store 240. The input feature embedding module 210 may obtain face images of faces and generate feature embeddings of one hundred twenty eight dimensions. Each of the feature embeddings may be normalized to 1.0 and represent a respective face image using the one hundred twenty eight dimensions. For example, the input feature embedding module 210 may receive one hundred face images and generate a matrix of input feature embeddings of one hundred by one hundred twenty eight values.

The spectral clustering module 220 may iteratively carve the embedding space into clusters. The number of clusters for the spectral clustering may be set to two, and an affinity of radial basis function (rbf) used as a default method to generate an affinity matrix for spectral clustering. Given the input with N feature embeddings, two clusters $C_0$ and $C_1$ may be generated after each iteration of running the Spectral Clustering. The size of clusters $C_0$ and $C_1$ is $N_0$, and $N_1$, respectively. The cluster $C_0$ is smaller than $C_1$ with the condition $N_0<N_1$ may always be true. By setting two variables $Th_1$ and $Th_2$ in the stop condition, the size of clusters in spectral clustering can be controlled. By iteratively running spectral clustering, several initial clusters maybe generated and stored in the clusters pool, and pushed to a user for review.

In some implementations, the spectral clustering module 220 may continue iteratively splitting clusters by performing spectral clustering on the clusters until $Th_2$ or fewer face images remain in the cluster. For clusters of $Th_2$ or fewer face images that also include $Th_1$ or more face images, the spectral clustering module 220 may push the cluster into a cluster pool for later review by a user. $Th_2$ may correspond to a number of faces that a user may easily review in a single user interface, and $Th_1$ may correspond to a lowest number of faces of a person needed to train a system to recognize the person. For example, $Th_2$ may be fifteen as fifteen face images may be simultaneously shown on a display and $Th_1$ may be ten as ten face images of a person may be needed to train a classifier to recognize the person's face.

In an example, the spectral clustering module 220 may receive one hundred face images of an unknown number of people. The spectral clustering module 220 may split the one hundred face images into a first cluster of forty faces and a second cluster of sixty faces, determine that the first cluster has more than fifteen face images so further split the first cluster into a first subcluster of ten faces and a second subcluster of thirty faces, determine that the first subcluster of ten face images has both fifteen or fewer face images and ten or more face images, and push the first subcluster into the cluster pool. In the example, the spectral clustering module 220 may continue iteratively splitting the second subcluster and the second cluster until a stop condition is satisfied.

The stop condition in the spectral clustering module 220 is further described below. The size of clusters in spectral clustering may be controlled by the two variables, $Th_1$ and $Th_2$. For example, the default value for the two variables may be $Th_1=12$, $Th_2=17$. There may be six cases in the stop condition. Case 1: The size of cluster $C_1$ satisfies the condition $N_1<Th_1$, then no further iteration of spectral clustering on cluster $C_1$, and no clusters are pushed to the clusters pool. Case 2: The size of cluster $C_0$ and $C_1$ satisfies the conditions $N_0<Th_1$ and $Th_1<=N_1<=Th_2$, then the cluster $C_1$ is pushed to the clusters pool. Case 3: The size of cluster $C_0$ and $C_1$ satisfies the conditions $N_0<Th_1$ and $N_1>Th_2$, then further iteration of Spectral Clustering is required on cluster $C_1$, and no clusters are pushed to the clusters pool. Case 4: The size of cluster $C_0$ and $C_1$ satisfies the conditions $Th_1<N_0$ and $N_1<=Th_2$, then both clusters $C_0$ and $C_1$ are pushed to the clusters pool. Case 5: The size of cluster $C_0$ and $C_1$ satisfies the conditions $Th_1<=N_0<=Th_2$ and $N_1>Th_2$, then the cluster $C_0$ is pushed the clusters pool, and run Spectral Clustering on cluster $C_1$. Case 6: The size of cluster $C_0$ and $C_1$ satisfies the conditions $N_0>Th_2$, then perform spectral clustering on cluster $C_0$ and $C_1$.

The user interaction module 230 may be configured to receive user feedback on enrollment for users. For example, the user interaction module 230 may generate a face verification user interface that displays a particular cluster in the cluster pool and receives user input that indicates which faces in the particular cluster correspond to which people.

The enrolled users data store 240 may receive clusters from the user interaction module where each of the clusters include at least $Th_1$ face images and store the clusters for use in later training a classifier to recognize the users with stored clusters. For example, the enrolled users data store 240 may store a first cluster for user X and a second cluster for user Y, and then train a deep learning neural network with a training data set that indicates the faces in the first cluster are of user X and the faces in the second cluster are of user Y. In some implementations, enrolled users data store 240 may be used for training one or more classifiers to recognize enrolled users when the cluster pool is empty after all clusters that were in the cluster pool are reviewed by a user.

Figure 3A:
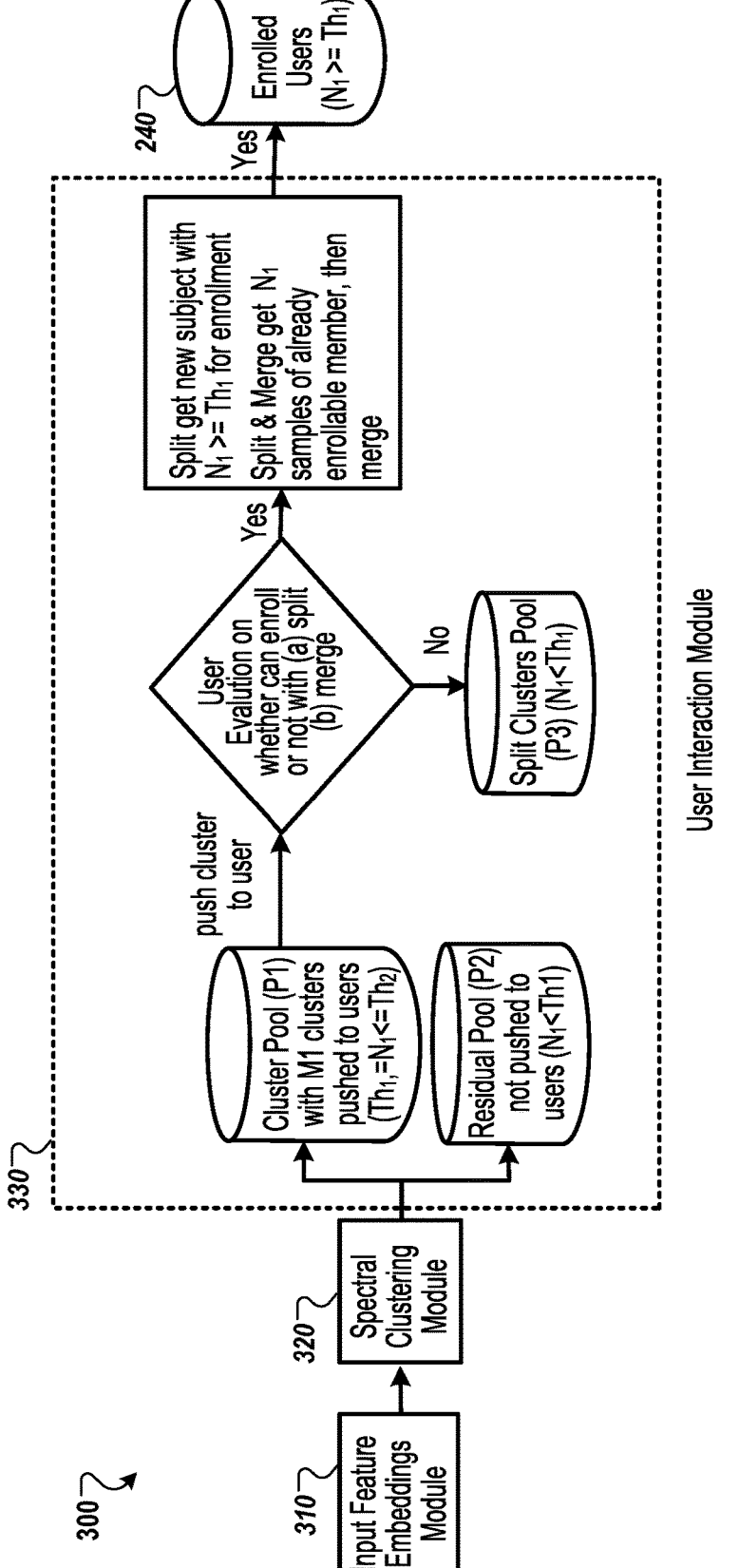
FIGS. 3A and 3B illustrate example block diagrams of processes of user enrollment based on user input.

FIG. 3A illustrates an example block diagram of a server 300 that enrolls users based on clusters of faces. In some implementations, the server 300 may be the server 120. The server 300 includes the input feature embedding module 210, the spectral clustering module 220, a user interaction module 330, and an enroll user data store 240. In some implementations, the user interaction module 330 may be the user interaction module 230 shown in FIG. 2.

The user interaction module 330 may be configured to store clusters in a clusters pool (P1), a residual pool (P2), and a split clusters pool (P3). The clusters pool (P1) may be a pool of clusters where each cluster has a size $N_i$ that satisfies the condition $Th_1<=N_i<=Th_2$. For example, the clusters in the cluster pool may each include ten to fifteen faces. The clusters in the clusters pool may be sorted based on the mean value of the pairwise distance of the feature embeddings. A smaller mean value may represent a better-quality cluster. The clusters would be pushed with ascending order to a user for review. For example, a cluster with faces that are most similar to each other may be pushed before a cluster with faces that are slightly less similar to each other.

The residual pool may be a pool of clusters that are not pushed to a user for review as the size of the clusters in the pool may each be less than $Th_1$. The split clusters pool may be a pool of clusters where each cluster in the split clusters pool is pure cluster and has a size less than $Th_1$. A pure cluster may be a cluster that a user has reviewed and indicated as including only faces of a particular person.

The split clusters pool may be populated based on user evaluation. Clusters may be sequentially individually pushed from the clusters pool, and displayed to the user for evaluation. The user may then use the user interface to split the faces in a cluster into several small but pure clusters which are stored in the pool P3, merge samples in the pushed cluster with a cluster that the user has already reviewed and is being used for enrollment, or merge samples in the pushed cluster with a cluster that the user has already reviewed and in the split clusters pool. For example, the user may indicate that in a cluster of fifteen face images, all face images correspond to a new user Z and the entire cluster may be added to the enrolled user data store 240. In another example, the user may indicate that in a cluster of fifteen face images, that all face images correspond to a user Z that was previously indicated as being shown in another cluster of ten face images and, in response, the user interaction module 330 may merge the fifteen new face images of user Z to the existing cluster of ten face images of user Z in the enrolled user data store 240 and form a combined cluster that includes both the fifteen face images and the ten face images for the user Z.

In yet another example, the user may indicate that in a cluster of fifteen face images that ten face images correspond to a new user Z and that five face images correspond to a user Y that already has a cluster of six face images in the split clusters pool and, in response, store in the enrolled user data 240 the cluster of ten face images that correspond to the new user Z and remove the cluster of six face images for user Y from the split clusters pool and store a new cluster for user Y that includes both the six face images from the split clusters pool and the five face images from the cluster of fifteen face images. In still yet another example, the user may indicate that in a cluster of fifteen face images that eight face images correspond to a new user Y and that seven face images correspond to a new user Z and, in response, store a cluster of eight face images for new user Y in the split clusters pool and a store cluster of seven face images for new user Z in split clusters pool.

Figure 3B:
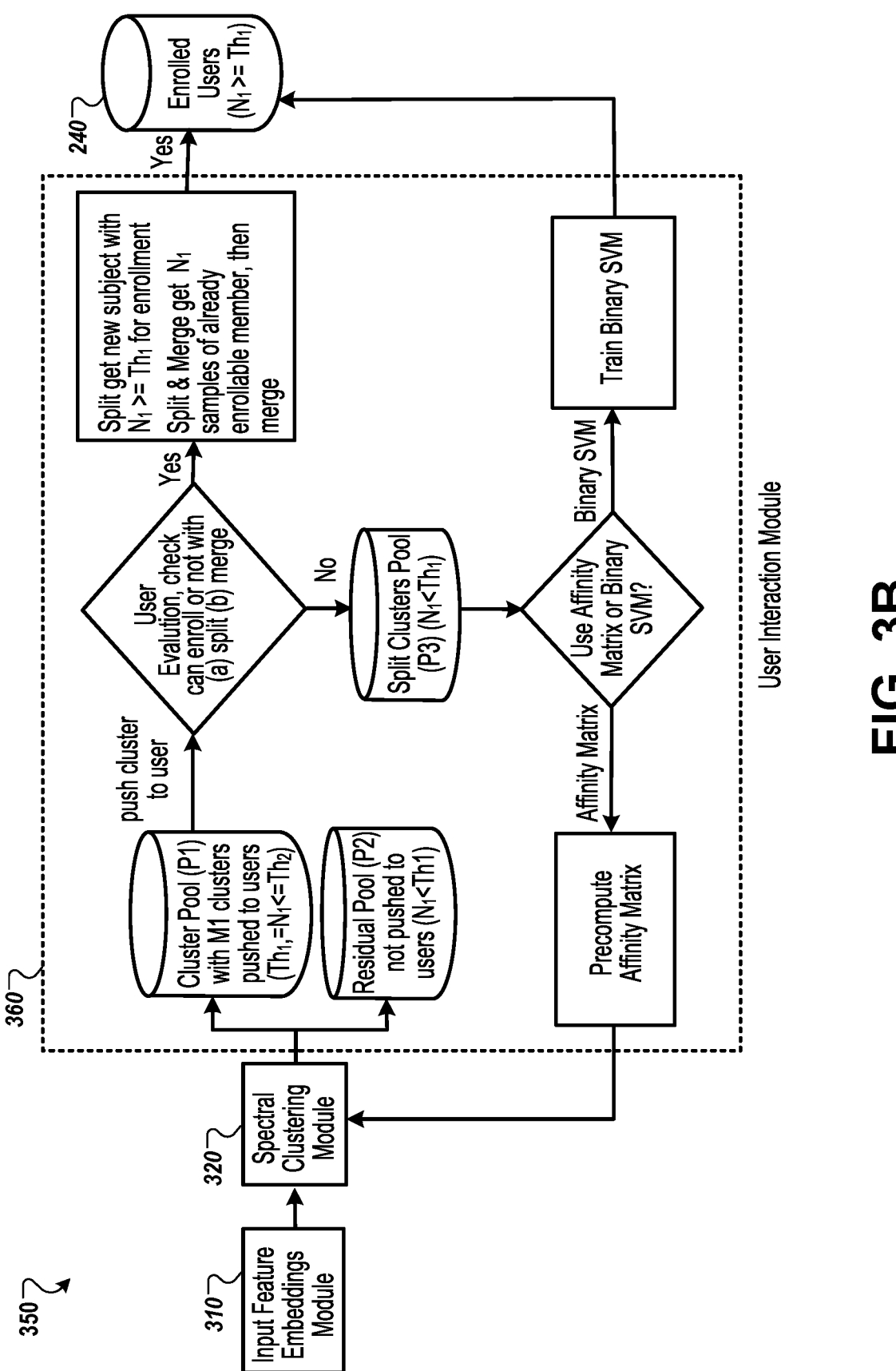

FIG. 3B illustrates another example block diagram of a server 350 that enrolls users based on clusters of faces. In some implementations, the server 350 may be the server 120. The server 350 includes the input feature embedding module 210, the spectral clustering module 220, a user interaction module 360, and an enrolled user data store 240. In some implementations, the user interaction module 360 may be the user interaction module 230 shown in FIG. 2. The user interaction module 360 may differ from the user interaction module 330 in that the user interaction module 360 may use pure clusters in the split clusters pool to generate additional clusters.

As shown in FIG. 3B, the split clusters pool may be used to precompute an affinity matrix that is used to generate new clusters, or train a binary support vector machine (SVM) used to generate a new cluster. In some implementations, the user interaction module 360 may continue to train binary SVMs when there is both at least $Th_3$ face images of a user in the split clusters pool and at least $Th_3$ face images of other users in the split clusters pool. A default value of $Th_3$ may be five. In some implementations, when the user interaction module 360 does not train binary SVMs, the user interaction module 360 precomputes an affinity matrix based on the clusters in the split clusters pool and generate new clusters based on spectral clustering using the precomputed affinity matrix.

Binary SVMs may be trained using the face images stored in the split clusters pool, and then SVM inference may be conducted to search for the positive samples in the clusters pool and the residual pool. The training and searching may terminate when the pool is empty. In regards to training, the face images stored in split clusters pool may be used as the training dataset. The number of positive class (N+) and negative class (N−) may satisfy the condition N+>=$Th_3$ and N−>=$Th_3$.

The user interaction module 360 may determine to train a binary SVM based on sorting the clusters in the split clusters pool by size (number of face images) of the cluster, and the cluster with largest size may be the dominant cluster. The dominant cluster may be the positive class, and the rest of the clusters may be the negative class during the training. In some implementations, the face images of the positive class may be labeled with a value of "1" and face images of the negative class may be labeled with "0." Then, a binary SVM may be trained using corresponding feature embeddings and labels.

Once a binary SVM is trained, the user interaction module 330 may then search the clusters in the cluster pool and residual pool to find the positive samples for the positive class. The user interaction module 330 may present positive samples to a user for evaluation and only store the true positive samples in the split clusters pool. For example, the user interaction module 330 may add the positive samples indicated by the user as also showing user Y into the pure cluster for user Y in the split clusters pool.

The user interaction module 330 may remove true positive samples from the cluster pool or the residual pool from which they were found. After all the clusters in the cluster pool and residual pool have been searched, the user interaction module 330 may then check the clusters in the split clusters pool to find any new enrollable members, e.g., find pure clusters with at least $Th_1$ face images. During the inference stage, the user interaction module 330 may dynamically change the samples of each cluster in the cluster pool, the residual pool, and the split clusters pool after each round of searching. For example, the user interaction module 330 may use a binary SVM that is trained from seven face images of user Z, identify five face images that are a positive match, receive user input that indicates that three of the matched face images are of user Z, move the three face images of user Z to the cluster that includes seven face images of user Z, and then store the ten face images of user Z together in the enrolled user data store 240 as there are at least $Th_1$ face images of user Z.

The affinity matrix may be precomputed based on small pure clusters stored in the split clusters pool, and then pairwise information from same users and different users may be utilized to boost the spectral clustering. In more detail, the user interaction module 330 may calculate the pairwise distance matrix $D_1$ of samples from the small pure clusters stored in the split clusters pool. In the matrix $D_1$, the user interaction module 330 may set lower value in the element from same user (e.g. the default value may be zero), and to set higher value in the element from different users (e.g., the default value may be two). The user interaction module 330 may combine the clusters in the cluster pool, residual pool, and split cluster pool, and then calculate the pairwise distance matrix $D_{all}$ of all the samples from the combined three pools. The user interaction module 330 may update the sub-matrix in $D_{all}$ corresponding the samples from the split cluster pool with the customized matrix $D_1$. The user interaction module 330 may run spectral clustering with the updated matrix $D_{all}$. The user interaction module 330 may update the cluster pool, the residual pool, and the split cluster pool after each iteration of running the spectral clustering.

Figure 4:
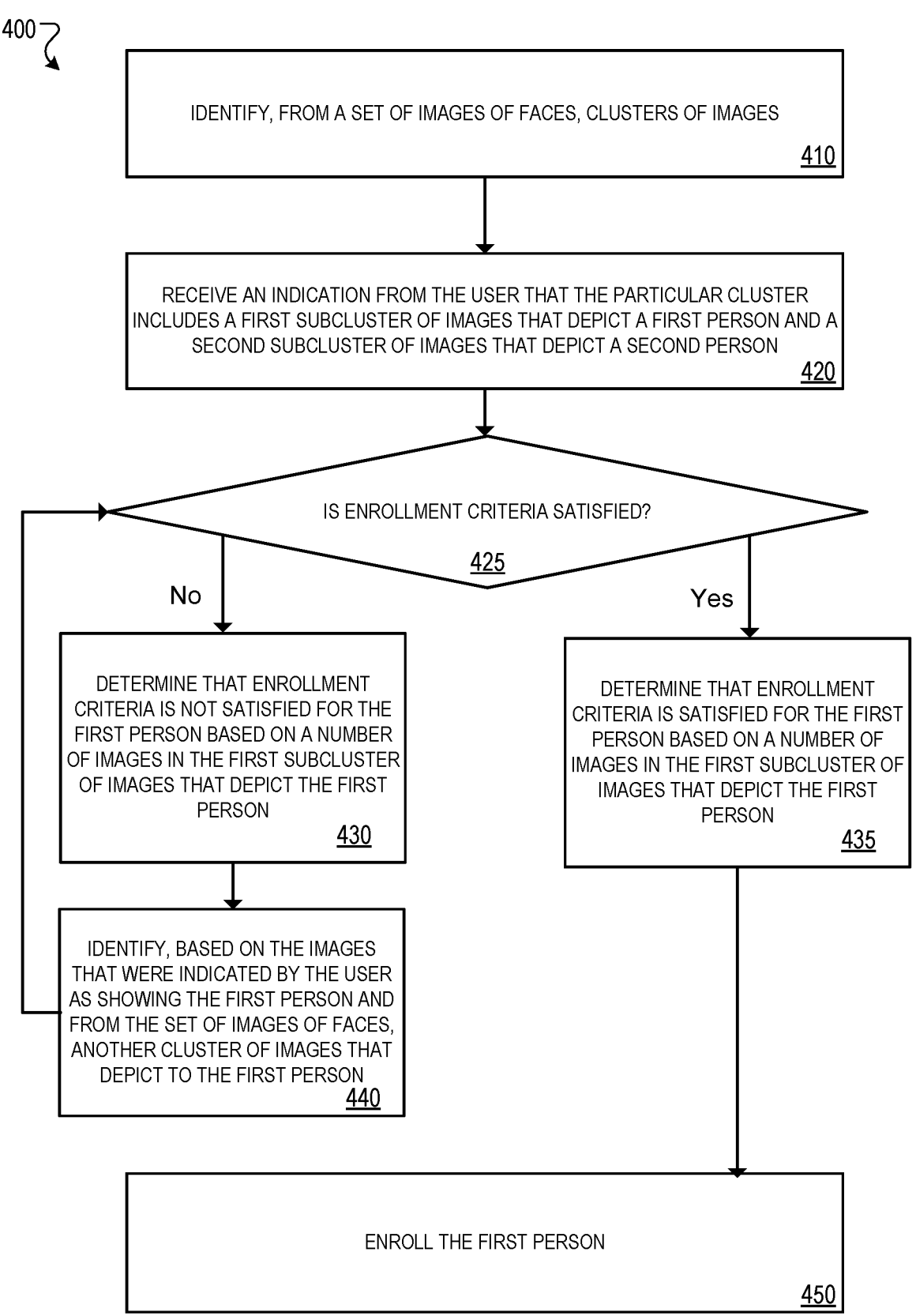
FIG. 4 is a flow diagram of an example for user enrollment for facial recognition using face clustering.

FIG. 4 is a flow diagram of an example process 400 for user enrollment for facial recognition using face clustering. Process 400 can be implemented using system 100 described above or some other system. Thus, descriptions of process 400 may reference one or more of the above-mentioned components, modules, or computational devices of system 100. In some implementations, described actions of process 400 are enabled by computing logic or software instructions executable by a processor and memory of an example electronic device.

The process 400 includes identifying, from a set of face images of faces, clusters of face images (410). The clusters of face images can include a particular cluster. For example, the server 120 may generate seven clusters of faces from one hundred face images of faces at the property 105, where the seven clusters includes a first cluster of fifteen faces that are more similar to each other than other faces in other clusters are similar to each other.

The process 400 includes receiving an indication that the particular cluster includes a first subcluster of face images that represent a first person and a second subcluster of face images that represent a second person (420). For example, the user may indicate through the face verification user interface shown on the user device 130 that a subcluster of faces 1-10 belong to user X and a subcluster of faces 11-15 belong to user Y.

The process 400 includes determining, based on the indication, whether the enrollment criteria is satisfied (425). The enrollment criteria can be a number of faces, e.g., ten, a quality of one or more of the faces, or a combination of both.

The process 400 includes determining, based on the indication, that enrollment criteria is not satisfied for the first person based on a number of face images in the first subcluster of face images that represent the first person (430). For example, the server 120 may determine that the subcluster of faces 11-15 that belong to user Y does not satisfy an enrollment criteria of at least ten faces.

The process 400 includes identifying, based on the face images that were indicated by the user as showing the first person and from the set of face images of faces, another cluster of face images that corresponds to the first person (440). For example, the server 120 may use the subcluster of faces 11-15 of user Y to generate an affinity matrix which is used to perform spectral clustering again on the face images and generate a new cluster of faces of user Y. In another example, the server 120 may train a binary support vector machine (SVM) using the subcluster of faces 11-15 in a training dataset to identify other face images of the user Y in the clusters in the clusters pool or the residual pool, and generate a new cluster that includes the subcluster of faces 11-15 and face images from the clusters in the cluster pool or the residual pool that were identified by the binary SVM as being of user Y.

In some examples, the process 400 includes determining, based on the indication, that enrollment criteria is satisfied for the first person based on a number of face images in the first subcluster of face images that represent the first person (435). For example, the server 120 may determine that the subcluster of faces 20-31 that belong to user Z satisfies the enrollment criteria of at least ten faces.

The process 400 includes enrolling the first person (450). When the subcluster satisfies the enrollment criteria, the enrollment can use only images in the subcluster. When the subcluster does not satisfy the enrollment criteria, the enrollment can use the other cluster of face images, or the other cluster and the subcluster. For example, the server 120 may enroll user Y using the new cluster of faces after the user indicates that the new cluster of faces includes only face images of user Y.

An alternate configuration of this system can be used to detect, recognize, and responds to other objects. For example, the system can be used to recognize vehicles in a parking system, boats in a marina, or aircraft at an airport. The system can also be used in factory or industrial settings for quality control or sorting.

Figure 5:
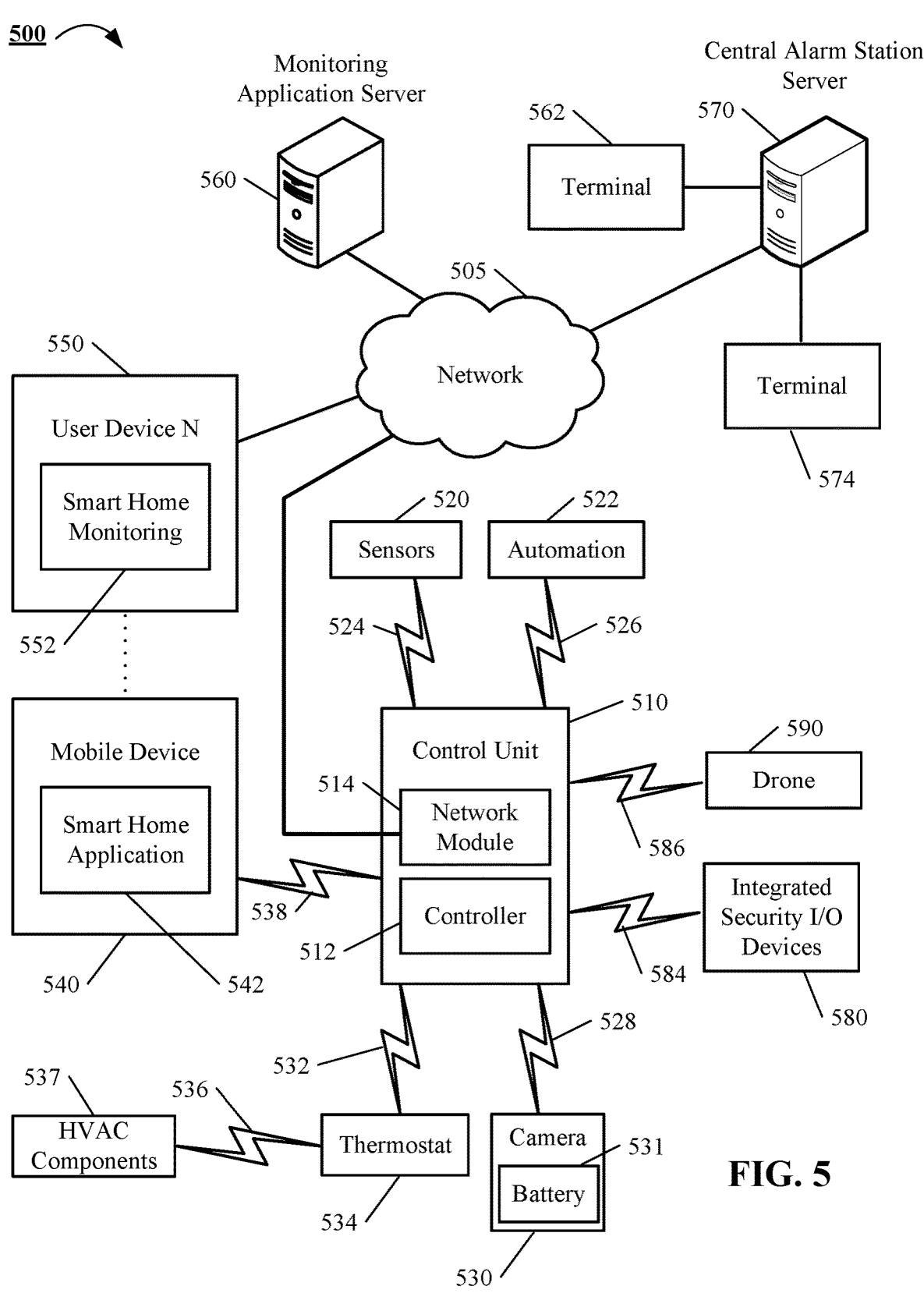
FIG. 5 is a block diagram of an example system for user enrollment for facial recognition using face clustering that may utilize one or more various components.

FIG. 5 is a block diagram of an example system 500 for user enrollment for facial recognition using face clustering that may utilize one or more various components. The electronic system 500 includes a network 505, a control unit 510, one or more user devices 540 and 550, a monitoring application server 560, and a central alarm station server 570. In some examples, the network 505 facilitates communications between the control unit 510, the one or more user devices 540 and 550, the monitoring application server 560, and the central alarm station server 570. In some implementations, the central alarm station server 570 may correspond to the server 120 and the user device 550 may correspond to the user device 130. In other implementations, the control unit 510 may correspond to the server 120.

The network 505 is configured to enable exchange of electronic communications between devices connected to the network 505. For example, the network 505 may be configured to enable exchange of electronic communications between the control unit 510, the one or more user devices 540 and 550, the monitoring application server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VOIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voiceband modem configured to enable the alarm panel to communicate over the telephone lines of Plain Old Telephone Systems (POTS).

The control unit system that includes the control unit 510 includes one or more sensors. For example, the monitoring system may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 520 may include a radio-frequency identification (RFID) sensor that identifies a particular article that includes a pre-assigned RFID tag.

The control unit 510 communicates with the module 522 and the camera 530 to perform monitoring. The module 522 is connected to one or more devices that enable home automation control. For instance, the module 522 may be connected to one or more lighting systems and may be configured to control operation of the one or more lighting systems. Also, the module 522 may be connected to one or more electronic locks at the property and may be configured to control operation of the one or more electronic locks (e.g., control Z-Wave locks using wireless communications in the Z-Wave protocol. Further, the module 522 may be connected to one or more appliances at the property and may be configured to control operation of the one or more appliances. The module 522 may include multiple modules that are each specific to the type of device being controlled in an automated manner. The module 522 may control the one or more devices based on commands received from the control unit 510. For instance, the module 522 may cause a lighting system to illuminate an area to provide a better image of the area when captured by a camera 530. The camera 530 can include one or more batteries 531 that require charging. A drone 590 can be used to survey the electronic system 500. In particular, the drone 590 can capture images of each item found in the electronic system 500 and provide images to the control unit 510 for further processing. Alternatively, the drone 590 can process the images to determine an identification of the items found in the electronic system 500.

The camera 530 may be a video/photographic camera or other type of optical sensing device configured to capture images. For instance, the camera 530 may be configured to capture images of an area within a building or within a residential property 102 monitored by the control unit 510. The camera 530 may be configured to capture single, static images of the area and also video images of the area in which multiple images of the area are captured at a relatively high frequency (e.g., thirty images per second). The camera 530 may be controlled based on commands received from the control unit 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the module 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring application server 560 over the Internet. In these implementations, image data captured by the camera 530 does not pass through the control unit 510 and the camera 530 receives commands related to operation from the monitoring application server 560.

The system 500 also includes thermostat 534 to perform dynamic environmental control at the property. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a property and/or environmental data at a property, e.g., at various locations indoors and outdoors at the property. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy-monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534.

A module 537 is connected to one or more components of an HVAC system associated with a property, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy-monitoring information and the state of the HVAC system components to the thermostat 534 and can control the one or more components of the HVAC system based on commands received from the thermostat 534.

In some examples, the system 500 further includes one or more robotic devices. The robotic devices may be any type of robots that are capable of moving and taking actions that assist in security-monitoring. For example, the robotic devices may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices may be robotic devices that are intended for other purposes and merely associated with the system 500 for use in appropriate circumstances. For instance, a robotic vacuum cleaner device may be associated with the monitoring system 500 as one of the robotic devices and may be controlled to take action responsive to monitoring system events.

In some examples, the robotic devices automatically navigate within a property. In these examples, the robotic devices include sensors and control processors that guide movement of the robotic devices within the property. For instance, the robotic devices may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices may include control processors that process output from the various sensors and control the robotic devices to move along a path that reaches the desired destination and avoids obstacles. In this regard, the control processors detect walls or other obstacles in the property and guide movement of the robotic devices in a manner that avoids the walls and other obstacles.

In addition, the robotic devices may store data that describes attributes of the property. For instance, the robotic devices may store a floorplan and/or a three-dimensional model of the property that enables the robotic devices to navigate the property. During initial configuration, the robotic devices may receive the data describing attributes of the property, determine a frame of reference to the data (e.g., a home or reference location in the property), and navigate the property based on the frame of reference and the data describing attributes of the property. Further, initial configuration of the robotic devices also may include learning of one or more navigation patterns in which a user provides input to control the robotic devices to perform a specific navigation action (e.g., fly to an upstairs bedroom and spin around while capturing video and then return to a home charging base). In this regard, the robotic devices may learn and store the navigation patterns such that the robotic devices may automatically repeat the specific navigation actions upon a later request.

In some examples, the robotic devices may include data capture and recording devices. In these examples, the robotic devices may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices to take and store a biometric sample that can be used to identify the person (e.g., a biometric sample with DNA that can be used for DNA testing).

In some implementations, the robotic devices may include output devices. In these implementations, the robotic devices may include one or more displays, one or more speakers, and/or any type of output devices that allow the robotic devices to communicate information to a nearby user.

The robotic devices also may include a communication module that enables the robotic devices to communicate with the control unit 510, each other, and/or other devices. The communication module may be a wireless communication module that allows the robotic devices to communicate wirelessly. For instance, the communication module may be a Wi-Fi module that enables the robotic devices to communicate over a local wireless network at the property. The communication module further may be a 900 MHz wireless communication module that enables the robotic devices to communicate directly with the control unit 510. Other types of short-range wireless communication protocols, such as Bluetooth, Bluetooth LE, Zwave, Zigbee, etc., may be used to allow the robotic devices to communicate with other devices in the property.

The robotic devices further may include processor and storage capabilities. The robotic devices may include any suitable processing devices that enable the robotic devices to operate applications and perform the actions described throughout this disclosure. In addition, the robotic devices may include solid state electronic storage that enables the robotic devices to store applications, configuration data, collected sensor data, and/or any other type of information available to the robotic devices.

The robotic devices are associated with one or more charging stations. The charging stations may be located at predefined home base or reference locations in the property. The robotic devices may be configured to navigate to the charging stations after completion of tasks needed to be performed for the monitoring system 500. For instance, after completion of a monitoring operation or upon instruction by the control unit 510, the robotic devices may be configured to automatically fly to and land on one of the charging stations. In this regard, the robotic devices may automatically maintain a fully charged battery in a state in which the robotic devices are ready for use by the monitoring system 500.

The charging stations may be contact based charging stations and/or wireless charging stations. For contact based charging stations, the robotic devices may have readily accessible points of contact that the robotic devices are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices may charge through a wireless exchange of power. In these cases, the robotic devices need only locate themselves closely enough to the wireless charging stations for the wireless exchange of power to occur. In this regard, the positioning needed to land at a predefined home base or reference location in the property may be less precise than with a contact based charging station. Based on the robotic devices landing at a wireless charging station, the wireless charging station outputs a wireless signal that the robotic devices receive and convert to a power signal that charges a battery maintained on the robotic devices.

In some implementations, each of the robotic devices has a corresponding and assigned charging station such that the number of robotic devices equals the number of charging stations. In these implementations, the robotic devices always navigate to the specific charging station assigned to that robotic device. For instance, a first robotic device may always use a first charging station and a second robotic device may always use a second charging station.

In some examples, the robotic devices may share charging stations. For instance, the robotic devices may use one or more community charging stations that are capable of charging multiple robotic devices. The community charging station may be configured to charge multiple robotic devices in parallel. The community charging station may be configured to charge multiple robotic devices in serial such that the multiple robotic devices take turns charging and, when fully charged, return to a predefined home base or reference location in the property that is not associated with a charger. The number of community charging stations may be less than the number of robotic devices.

Also, the charging stations may not be assigned to specific robotic devices and may be capable of charging any of the robotic devices. In this regard, the robotic devices may use any suitable, unoccupied charging station when not in use. For instance, when one of the robotic devices has completed an operation or is in need of battery charge, the control unit 510 references a stored table of the occupancy status of each charging station and instructs the robotic device to navigate to the nearest charging station that is unoccupied.

The system 500 further includes one or more integrated security devices 580. The one or more integrated security devices may include any type of device used to provide alerts based on received sensor data. For instance, the one or more control units 510 may provide one or more alerts to the one or more integrated security input/output devices. Additionally, the one or more control units 510 may receive one or more sensor data from the sensors 520 and determine whether to provide an alert to the one or more integrated security input/output devices 580.

The sensors 520, the module 522, the camera 530, the thermostat 534, drone 590, and the integrated security devices 580 communicate with the controller 512 over communication links 524, 526, 528, 532, 584, and 586. The communication links 524, 526, 528, 532, 584, and 586 may be a wired or wireless data pathway configured to transmit signals from the sensors 520, the module 522, the camera 530, the thermostat 534, the drone 590, and the integrated security devices 580 to the controller 512. The sensors 520, the module 522, the camera 530, the thermostat 534, the drone 590, and the integrated security devices 580 may continuously transmit sensed values to the controller 512, periodically transmit sensed values to the controller 512, or transmit sensed values to the controller 512 in response to a change in a sensed value. In some implementations, the drone 590 can communicate with the monitoring application server 560 over network 505. The drone 590 can connect and communicate with the monitoring application server 560 using a Wi-Fi or a cellular connection.

The communication links 524, 526, 528, 532, 584, and 586 may include a local network. The sensors 520, the module 522, the camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 5 (CAT6) wired Ethernet network. The local network may be a mesh network constructed based on the devices connected to the mesh network.

The monitoring application server 560 is an electronic device configured to provide monitoring services by exchanging electronic communications with the control unit 510, the one or more user devices 540 and 550, and the central alarm station server 570 over the network 505. For example, the monitoring application server 560 may be configured to monitor events (e.g., alarm events) generated by the control unit 510. In this example, the monitoring application server 660 may exchange electronic communications with the network module 514 included in the control unit 510 to receive information regarding events (e.g., alerts) detected by the control unit server 104a. The monitoring application server 560 also may receive information regarding events (e.g., alerts) from the one or more user devices 540 and 550.

In some examples, the monitoring application server 560 may route alert data received from the network module 514 or the one or more user devices 540 and 550 to the central alarm station server 570. For example, the monitoring application server 560 may transmit the alert data to the central alarm station server 570 over the network 505.

The monitoring application server 560 may store sensor and image data received from the monitoring system and perform analysis of sensor and image data received from the monitoring system. Based on the analysis, the monitoring application server 560 may communicate with and control aspects of the control unit 510 or the one or more user devices 540 and 550.

The central alarm station server 570 is an electronic device configured to provide alarm monitoring service by exchanging communications with the control unit 510, the one or more mobile devices 540 and 550, and the monitoring application server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more mobile devices 540 and 550 and/or the monitoring application server 560.

The central alarm station server 570 is connected to multiple terminals 562 and 574. The terminals 562 and 574 may be used by operators to process alerting events. For example, the central alarm station server 570 may route alerting data to the terminals 562 and 574 to enable an operator to process the alerting data. The terminals 562 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 562 for processing by an operator associated with the terminal 562. The terminal 562 may render a display to the operator that includes information associated with the alerting event (e.g., the lock sensor data, the motion sensor data, the contact sensor data, etc.) and the operator may handle the alerting event based on the displayed information.

In some implementations, the terminals 562 and 574 may be mobile devices or devices designed for a specific function. Although FIG. 5 illustrates two terminals for brevity, actual implementations may include more (and, perhaps, many more) terminals.

The one or more user devices 540 and 550 are devices that host and display user interfaces. For instance, the user device 540 is a mobile device that hosts one or more native applications (e.g., the smart home application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a smart home application 542. The smart home application 542 refers to a software/firmware program running on the corresponding mobile device that enables the user interface and features described throughout. The user device 540 may load or install the smart home application 542 based on data received over a network or data received from local media. The smart home application 542 runs on mobile devices platforms, such as iPhone, iPod touch, Blackberry, Google Android, Windows Mobile, etc. The smart home application 542 enables the user device 540 to receive and process image and sensor data from the monitoring system.

The user device 550 may be a general-purpose computer (e.g., a desktop personal computer, a workstation, or a laptop computer) that is configured to communicate with the monitoring application server 560 and/or the control unit 510 over the network 505. The user device 550 may be configured to display a smart home user interface 552 that is generated by the user device 550 or generated by the monitoring application server 560. For example, the user device 550 may be configured to display a user interface (e.g., a web page) provided by the monitoring application server 560 that enables a user to perceive images captured by the camera 530 and/or reports related to the monitoring system. Although FIG. 6 illustrates two user devices for brevity, actual implementations may include more (and, perhaps, many more) or fewer user devices.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Zwave, Zigbee, HomePlug (ethernet over powerline), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring application server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring application server 560 may relay data received from the control unit 510 to the one or more user devices 540 and 550 through the network 505. In this regard, the monitoring application server 560 may facilitate communication between the one or more user devices 540 and 550 and the monitoring system.

In some implementations, the one or more user devices 540 and 550 may be configured to switch whether the one or more user devices 540 and 550 communicate with the control unit 510 directly (e.g., through link 538) or through the monitoring application server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring application server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 only includes the one or more user devices 540 and 550, the sensors 520, the module 522, the camera 530, and the robotic devices. The one or more user devices 540 and 550 receive data directly from the sensors 520, the module 522, the camera 530, and the robotic devices and sends data directly to the sensors 520, the module 522, the camera 530, and the robotic devices. The one or more user devices 540, 550 provide the appropriate interfaces/processing to provide visual surveillance and reporting.

In other implementations, the system 500 further includes network 505 and the sensors 520, the module 522, the camera 530, the thermostat 534, and the robotic devices are configured to communicate sensor and image data to the one or more user devices 540 and 550 over network 505 (e.g., the Internet, cellular network, etc.). In yet another implementation, the sensors 520, the module 522, the camera 530, the thermostat 534, and the robotic devices (or a component, such as a bridge/router) are intelligent enough to change the communication pathway from a direct local pathway when the one or more user devices 540 and 550 are in close physical proximity to the sensors 520, the module 522, the camera 530, the thermostat 534, and the robotic devices to a pathway over network 505 when the one or more user devices 540 and 550 are farther from the sensors 520, the module 522, the camera 530, the thermostat 534, and the robotic devices. In some examples, the system leverages GPS information from the one or more user devices 540 and 550 to determine whether the one or more user devices 540 and 550 are close enough to the sensors 520, the module 522, the camera 530, the thermostat 534, and the robotic devices to use the direct local pathway or whether the one or more user devices 540 and 550 are far enough from the sensors 520, the module 522, the camera 530, the thermostat 534, and the robotic devices that the pathway over network 505 is required. In other examples, the system leverages status communications (e.g., pinging) between the one or more user devices 540 and 550 and the sensors 520, the module 522, the camera 530, the thermostat 534, and the robotic devices to determine whether communication using the direct local pathway is possible. If communication using the direct local pathway is possible, the one or more user devices 540 and 550 communicate with the sensors 520, the module 522, the camera 530, the thermostat 534, and the robotic devices using the direct local pathway. If communication using the direct local pathway is not possible, the one or more user devices 540 and 550 communicate with the sensors 520, the module 522, the camera 530, the thermostat 534, and the robotic devices using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 uses several techniques to reduce costs while providing access to significant levels of useful visual information.

In some implementations, a state of the monitoring system and other events sensed by the monitoring system may be used to enable/disable video/image recording devices (e.g., the camera 530). In these implementations, the camera

530 may be set to capture images on a periodic basis when the alarm system is armed in an "Away" state, but set not to capture images when the alarm system is armed in a "Stay" state or disarmed. In addition, the camera 530 may be triggered to begin capturing images when the alarm system detects an event, such as an alarm event, a door-opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A computer-implemented method comprising:
  identifying, from a set of face images of faces, clusters of face images, where the clusters of face images include a first cluster;
  determining whether the first cluster includes images for only a single person;
  in response to determining that the first cluster does not include images for only a single person:

detecting, in the first cluster, a first subcluster of face images that depict a first person and a second subcluster of face images that depict a second, different person; and determining whether i) a number of face images in the first subcluster of face images that depict the first person satisfies an enrollment criteria for faces that were clustered with similar looking people and ii) additional images of the first person are not required to enroll the first person in a facial recognition database;

in response to determining that i) the number of face images in the first subcluster of face images that depict the first person does not satisfy the enrollment criteria for faces that were clustered with similar looking people and ii) additional images of the first person are required to enroll the first person in a facial recognition database;

detecting, from the set of face images of faces, another cluster of face images that includes additional images that depict the first person using data for the face images from the first subcluster that were indicated as showing the first person, the other cluster of faces that depict the first person including at least one face image that is not included in the first subcluster of face images that depict the first person; and enrolling, in the facial recognition database, the first person using the other cluster of face images that includes additional images that depict the first person.

2. The method of claim 1, comprising:

in response to receiving an indication, determining that a second number of face images in the second subcluster of face images that depict the second person satisfies the enrollment criteria; and in response to determining that the second number satisfies the enrollment criteria, enrolling, in the facial recognition database, the second person using the second subcluster of face images that depict the second person.

3. The method of claim 1, wherein enrolling the first person uses the other cluster of face images and the first subcluster of face images.

4. The method of claim 1, comprising providing the cluster of face images to a device; and receiving an indication responsive to providing the cluster of face images.

5. The method of claim 4, wherein:

providing the cluster of face images comprises providing a cluster of unknown face images to the device; and identifying the other cluster of face images comprises detecting, using clustering with the first subcluster of face images and in a plurality of images, the other cluster of face images that depict the first person.

6. The method of claim 5, wherein detecting the other cluster of face images uses a spectral clustering.

7. The method of claim 1, comprising providing data for the facial recognition database to a facial recognition system to cause the facial recognition system to recognize one or more people including the first person using the facial recognition database.

8. The method of claim 1, comprising:

recognizing, using data for the other cluster of face images in the facial recognition database, the first person; and in response to recognizing the first person, determining whether to perform an action or to skip performing an action.

9. The method of claim 8, comprising, in response to recognizing the first person, sending an instruction to a door to cause the door to unlock.

10. The method of claim 8, comprising, in response to recognizing the first person, determining to skip sending, to a second device, an alert about the first person.

11. The method of claim 1, wherein identifying the other cluster comprises identifying the other cluster using at least one of an affinity matrix or a binary support vector machine.

12. A system comprising one or more computers and one or more storage devices on which are stored instructions that are operable, when executed by the one or more computers, to cause the one or more computers to perform operations comprising:

identifying, from a set of face multiple images of faces, clusters of face images, where the clusters of face images include a first cluster;

determining whether the first cluster includes images for only a single person;

in response to determining that the first cluster does not include images for only a single person:

detecting in the first cluster, a first subcluster of face images that depict a first person and a second subcluster of face images that depict a second, different person; and determining whether i) a number of face images in the first subcluster of face images that depict the first person satisfies an enrollment criteria for faces that were clustered with similar looking people and ii) additional images of the first person are not required to enroll the first person in a facial recognition database;

in response to determining that i) the number of face images in the first subcluster of face images that depict the first person does not satisfy the enrollment criteria for faces that were clustered with similar looking people and ii) additional images of the first person are required to enroll the first person in a facial recognition database:

detecting, from the set of multiple face images of faces, another cluster of face images that includes additional images that depict the first person using data for the face images from the first subcluster that were indicated as showing the first person, the other cluster of faces that depict the first person including at least one face image that is not included in the first subcluster of face images that depict the first person; and enrolling, in the facial recognition database, the first person using the other cluster of face images that includes the additional images that depict the first person.

13. The system of claim 12, the operations comprising:

in response to receiving an indication, determining that a second number of face images in the second subcluster of face images that depict the second person satisfies the enrollment criteria; and in response to determining that the second number satisfies the enrollment criteria, enrolling, in the facial recognition database, the second person using the second subcluster of face images that depict the second person.

14. The system of claim 12, wherein enrolling the first person uses the other cluster of face images and the first subcluster of face images.

15. The system of claim 12, the operations comprising providing the cluster of face images to a device; and
    receiving an indication responsive to providing the cluster of face images.

16. The system of claim 15, wherein:
    providing the cluster of face images comprises providing a cluster of unknown face images to the device; and
    identifying the other cluster of face images comprises detecting, using clustering with the first subcluster of face images and in a plurality of images, the other cluster of face images that depict the first person.

17. A non-transitory computer storage medium encoded with instructions that, when executed by one or more computers, cause the one or more computers to perform operations comprising:
    identifying, from a set of multiple face images of faces, clusters of face images, where the clusters of face images include a first cluster;
    determining whether the first cluster includes images for only a single person;
    in response to determining that the first cluster does not include images for only a single person:
        detecting, in the first cluster, a first subcluster of face images that depict a first person and a second subcluster of face images that depict a second, different person; and
        determining i) whether a number of face images in the first subcluster of face images that depict the first person satisfies an enrollment criteria for faces that were clustered with similar looking people and ii) additional images of the first person are not required to enroll the first person in a facial recognition database;
        in response to determining that i) the number of face images in the first subcluster of face images that depict the first person does not satisfy the enrollment criteria for faces that were clustered with similar looking people and ii) additional images of the first person are required to enroll the first person in a facial recognition database:
    detecting, from the set of multiple face images of faces, another cluster of face images that includes additional images that depict the first person using data for the face images from the first subcluster that were indicated as showing the first person, the other cluster of faces that depict the first person including at least one face image that is not included in the first subcluster of face images that depict the first person; and
    enrolling, in the facial recognition database, the first person using the other cluster of face images that includes the additional images that depict the first person.

18. The non-transitory computer storage medium of claim 17, the operations comprising:
    in response to receiving an indication, determining that a second number of face images in the second subcluster of face images that depict the second person satisfies the enrollment criteria; and
    in response to determining that the second number satisfies the enrollment criteria, enrolling, in the facial recognition database, the second person using the second subcluster of face images that depict the second person.

19. The non-transitory computer storage medium of claim 17, wherein enrolling the first person uses the other cluster of face images and the first subcluster of face images.

20. The non-transitory computer storage medium of claim 17, the operations comprising providing the cluster of face images to a device; and
    receiving an indication responsive to providing the cluster of face images.

\* \* \* \* \*